United States Patent
Wilson et al.

(10) Patent No.: US 9,336,803 B1
(45) Date of Patent: May 10, 2016

(54) PSEUDO-DIFFERENTIAL SHARED-PIN READER FOR TWO-DIMENSIONAL MAGNETIC RECORDING

(71) Applicant: Avago Technologies General IP (Singapore) Pte. Ltd., Singapore (SG)

(72) Inventors: Ross S. Wilson, Menlo Park, CA (US); Scott M. O'Brien, Mendota Heights, MN (US); Jeffrey A. Gleason, Mendota Heights, MN (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/577,023

(22) Filed: Dec. 19, 2014

(51) Int. Cl.
*G11B 5/03* (2006.01)
*G11B 5/48* (2006.01)
*G11B 5/09* (2006.01)
*G11B 5/00* (2006.01)

(52) U.S. Cl.
CPC .............. *G11B 5/4853* (2013.01); *G11B 5/03* (2013.01); *G11B 5/09* (2013.01); *G11B 2005/0008* (2013.01)

(58) Field of Classification Search
CPC ............... G11B 2005/0002; G11B 2005/0008; G11B 5/29; G11B 5/3103; G11B 5/4813; G11B 5/59668; G11B 5/03
USPC ........... 360/18, 22, 39, 46, 47, 63, 64, 66, 67, 360/234.5, 316
See application file for complete search history.

(56) References Cited

U.S. PATENT DOCUMENTS

| | | | | |
|---|---|---|---|---|
| 6,104,562 A | * | 8/2000 | Ottesen | G11B 5/012 360/316 |
| 6,265,905 B1 | * | 7/2001 | Jove | H03F 1/22 327/178 |
| 7,525,768 B2 | * | 4/2009 | Wu | G11B 5/4846 360/264.2 |
| 8,233,240 B2 | * | 7/2012 | Contreras | G11B 5/484 360/245.9 |
| 2005/0212599 A1 | * | 9/2005 | Lin | H03F 3/45659 330/258 |
| 2006/0255859 A1 | * | 11/2006 | Zanchi | H03F 3/42 330/277 |
| 2009/0251821 A1 | * | 10/2009 | Song | G11B 5/1278 360/110 |
| 2014/0063639 A1 | | 3/2014 | Dean | |
| 2015/0077879 A1 | * | 3/2015 | Contreras | G11B 5/486 360/67 |

OTHER PUBLICATIONS

U.S. Appl. No. 14/454,843, filed Aug. 8, 2014 for a "Pre-Amplifier Input Stage for Multi-Element Magneto-Resistive Heads" of Wilson et al.

* cited by examiner

*Primary Examiner* — Thomas Alunkal (57) ABSTRACT

An apparatus for two-dimensional magnetic recording includes a storage medium, an array of magnetoresistive read heads disposed adjacent the storage medium and spaced to read a data track, wherein the array of magnetoresistive read heads share a common terminal, a number of leads connected to the array of magnetoresistive read heads, with one lead for each of the magnetoresistive read heads, plus a common lead connected to the common terminal, wherein each of the plurality of leads other than the at least one common lead are referenced to the at least one common lead, and a preamplifier connected to the array of magnetoresistive read heads by the plurality of leads and operable to perform pseudo-differential sensing or single-ended sensing of signals from the array of magnetoresistive read heads.

22 Claims, 7 Drawing Sheets

PSEUDO-DIFFERENTIAL SHARED-PIN READER FOR TWO-DIMENSIONAL MAGNETIC RECORDING

FIELD OF THE INVENTION

Various embodiments of the present invention provide for a pseudo-differential shared-pin reader for two-dimensional magnetic recording.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a signal in the read head that can be converted to the previously recorded digital data. In a two-dimensional magnetic recording system, the read/write head assembly includes an array of multiple read heads each positioned to read the target track and portions of the two bordering tracks. Signals from the read heads are processed first by a preamplifier, then by a read channel to retrieve the data stored on the storage medium. Because the read heads are moved over the storage medium in the magnetic storage system, the read/write head assembly is connected to the preamplifier by a flexible cable or flex cable. As the number of read heads in the read/write head assembly is increased, the conductors in the flexible cable and the circuit area in the preamplifier is increased.

BRIEF SUMMARY

Embodiments of the present invention provide a read preamplification apparatus capable of pseudo-differential sensing of read head arrays sharing a common terminal within a two-dimensional magnetic recording system. Further embodiments provide means to reconfigure the pseudo-differential sensing apparatus into single-ended sensing mode. Some embodiments include a storage medium, an array of magnetoresistive read heads disposed adjacent the storage medium and spaced to read a data track, wherein the array of magnetoresistive read heads share a common terminal, a number of leads connected to the array of magnetoresistive read heads, with one lead for each of the magnetoresistive read heads, plus a common lead connected to the common terminal, wherein each of the plurality of leads other than the at least one common lead are referenced to the at least one common lead, and a preamplifier connected to the array of magnetoresistive read heads by the plurality of leads and operable to perform pseudo-differential sensing of signals from the array of magnetoresistive read heads.

This summary provides only a general outline of some embodiments according to the present invention. Many other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

DETAILED DESCRIPTION OF THE INVENTION

Embodiments of the present invention are related to a pseudo-differential shared-pin reader for two-dimensional magnetic recording with sensor biasing. Two-dimensional magnetic recording (TDMR) includes the use of an array of multiple read heads or magnetoresistive (MR) sensors in a read head assembly, which are read simultaneously, thereby reading the data track with multiple sensors, and increasing the areal density by accounting for information bordering the principal track. Direct connections between a preamplifier and a read head assembly with N read heads would require 2N terminal pairs, however, this is undesirable for size and flexibility of the flexible cable between the preamplifier and the read head assembly, which is on a movable slider over the storage medium. The preamplifier and read head assembly connection and biasing circuits disclosed herein support head assemblies having N+1 interconnects, one interconnect per read head with one shared or common interconnect.

The biasing circuits disclosed herein can bias each read head independently. Each read head can be biased at different operating points.

A voltage driver in the biasing circuit controls the DC voltage on the common lead while simultaneously presenting a high impedance on the common terminal, so as not to impair differential sensing. The biasing circuit increases robustness against coupled interference for an N+1-lead reader and provides MR bias and DC nulling loops which operate properly in N+1 mode. The biasing circuit also provides for rapid transition from not-reading, to reading, modes.

In some embodiments, the preamplifier reader can be switched between pseudo-differential and single-ended operation to permit a single integrated circuit to support user preference of system architecture. The input stage uses replica biasing to set the standing current of the input stage while in single-ended mode.

Figure 1:
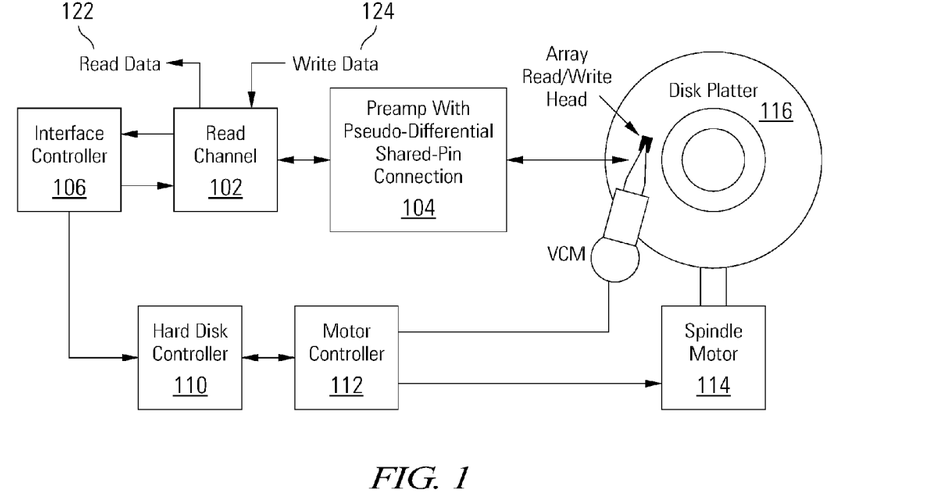
FIG. 1 depicts a two-dimensional magnetic recording storage system including a pseudo-differential shared-pin read head and preamplifier in accordance with some embodiments of the present invention.

Turning to FIG. 1, a storage system 100 is illustrated as an example application of a pseudo-differential shared-pin reader for two-dimensional magnetic recording in accordance with some embodiments of the present invention. The storage system 100 includes a read/write head assembly 120 with an array of read heads or magnetoresistive (MR) sensors, connected to a preamplifier 104 with a shared-pin connection. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, data magnetically recorded on disk platter 116 are sensed by the array of MR sensors in read/write head assembly 120 as disk platter 116 is rotated by spindle motor 114. The resulting readback signals are provided as continuous, minute analog signals representative of the magnetic data on disk platter 116. These minute analog signals are transferred from read/write head assembly 120 to read channel circuit 102 via preamplifier 104. Preamplifier 104 is operable to amplify the minute analog signals accessed from disk platter 116, as well as to bias the MR sensors in read/write head assembly 120. In turn, read channel circuit 102 digitizes and decodes the received analog signal to recreate the information originally written to disk platter 116. This data is provided as read data 122 to a receiving circuit. Servo position data pre-recorded on disc 116 passes through preamplifier 104, read channel 102, to hard disc controller 110 and motor controller 112, where they are used to regulate position of the read/write head. A write operation is substantially the opposite of the preceding read operation with write data 124 being provided to read channel circuit 102.

It should be noted that storage system 100 can be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 100 can be modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory can be used as a cache where it offers faster access time than that offered by disk platter 116. In such a case, the solid state memory can be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

Figure 2:
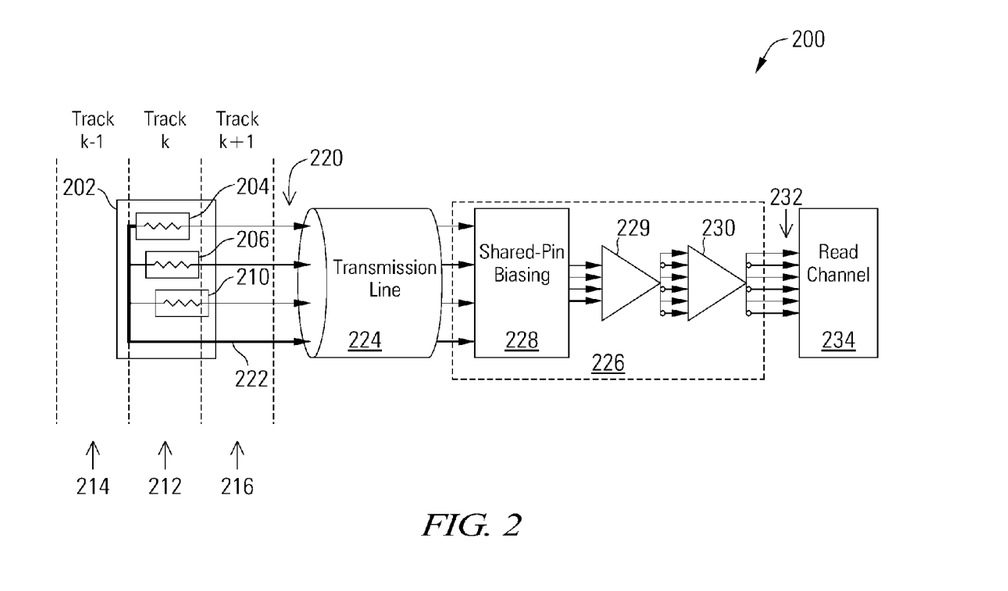
FIG. 2 depicts a head slider with an array of read heads having a shared-pin connection, connected to a pseudo-differentially-sensed preamplifier in accordance with some embodiments of the present invention.

Turning to FIG. 2, a diagram 200 depicts a head slider 202 with an array of MR read heads 204, 206, 210, connected to a preamplifier 226 by a shared-pin connection in accordance with some embodiments of the present invention. In some embodiments, the preamplifier 226 is implemented as a cascade of at least two stages: a low-noise input stage "LNA" 229 followed by one or more second stages 230 affording gain and output-driving capabilities. The signals from heads 204, 206, 210 are sensed pseudo-differentially by the LNA 229 in the preamplifier 226. The MR read heads 204, 206, 210 are connected to the LNA 229 through a flexible circuit or transmission line 224 having N+1 leads 220, including a common lead 222. In this embodiment, having three read heads 204, 206, 210, N=3. However, the pseudo-differential shared-bin reader and biasing circuit is not limited to any particular number of read heads in a two-dimensional magnetic recording system. The read heads 204, 206, 210 are depicted schematically as resistors inside of boxes that illustrate their location relative to one another and to the data tracks 212, 214, 216, however, the read heads 204, 206, 210 can comprise any suitable type of sensor.

A biasing circuit 228 within preamplifier 226 controls the DC voltage on the common lead 222 and biases each read head 204, 206, 210, either with controlled current or controlled voltage biasing. Each read head 204, 206, 210 is biased individually in some embodiments.

In operation, the head slider 202 is positioned over a principal data track 212 on a magnetic disk platter, and as the disk platter is rotated, the magnetic medium induces or modulates the electrical currents through the read heads 204, 206, 210. The resulting readback signals on the N+1 leads 220 are representative of the data written to the data track 212, and to some extent of the data written to neighboring data tracks 214, 216.

A low-noise amplifier 229 within a preamplifier 226 provides low-noise amplification of the minute analog signals on the N+1 leads 220. The biasing circuit 228 is incorporated in the preamplifier 226 in some embodiments.

The amplified analog signals are provided to a read channel circuit 234, for example using differential connections 232. The read channel circuit 234 can process the signals in any suitable manner. In some embodiments, the read channel circuit 234 includes an analog front end performing further amplification, biasing, and filtering, one or more analog to digital converters generating digital samples based on the analog signals, equalizers that filter the digital samples, one or more data detectors such as, but not limited to, Viterbi algorithm detectors to identify the values in the equalized data samples, and one or more data decoders such as, but not limited to, Reed Solomon decoders or Low Density Parity Check decoders to perform error detection and correction of the data. Adjacent track interference in the readback signals on the N+1 leads 220 is also sampled and mitigated by multi-dimensional signal-processing algorithms in some embodiments of the read channel circuit 234, leading to improved error-rate performance relative to a single-reader configuration.

The biasing circuit 228 can provide either current bias or voltage bias to the read heads 204, 206, 210. The biasing circuit 228 can either be configured to perform only one type of head biasing, or can be configured with both current-mode and voltage-mode biasing, including gating circuitry to provide for selection of the desired method.

Figure 3:
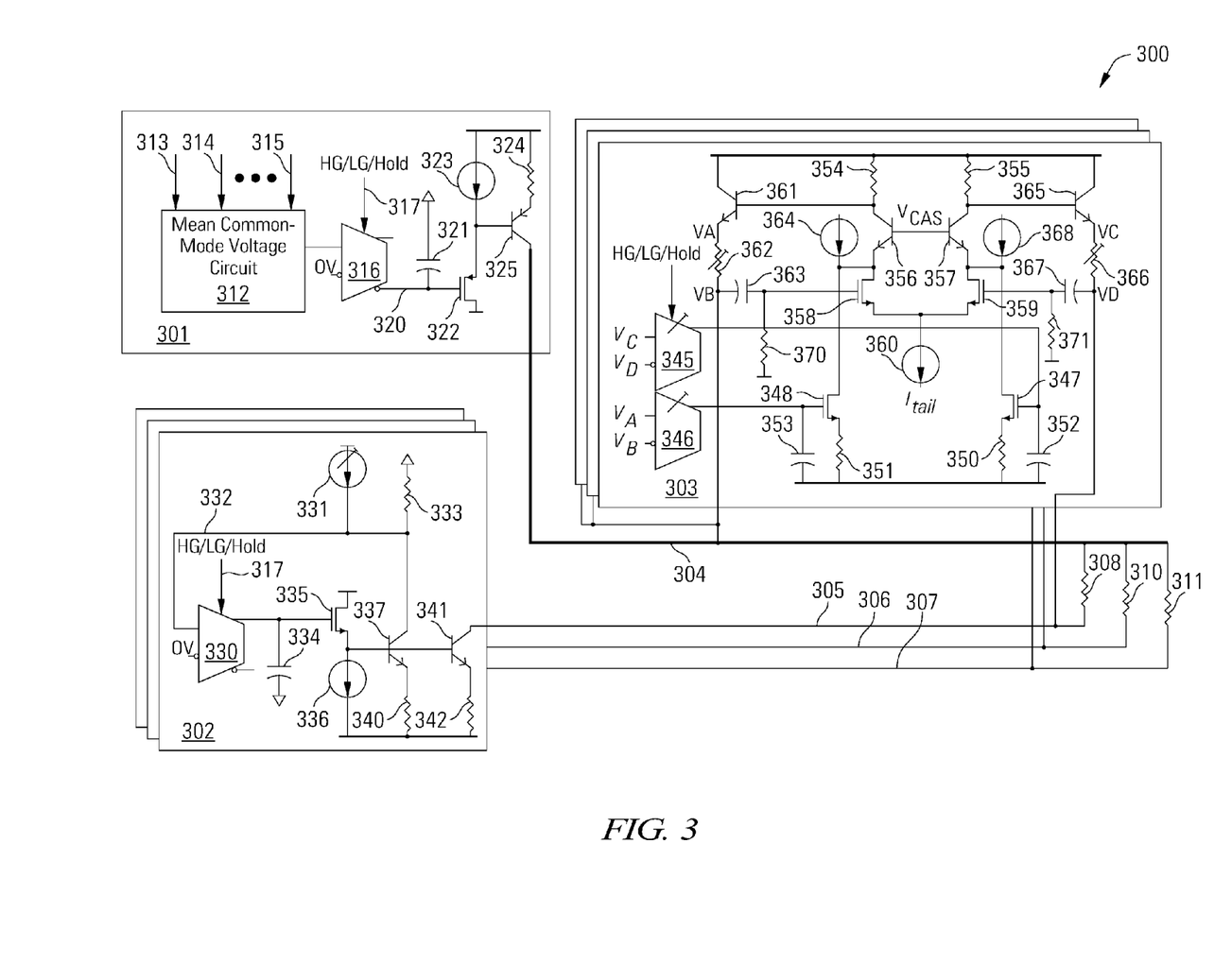
FIG. 3 depicts a current-mode head bias circuit for a pseudo-differential shared-pin array of read heads in accordance with some embodiments of the present invention.

Turning to FIG. 3, a current-mode head bias circuit 300 for a pseudo-differential shared-pin array of read heads is depicted in accordance with some embodiments of the present invention. A common lead stabilizer circuit 301 is connected to the common lead 304 to the MR read heads 308, 310, 311, stabilizing the DC voltage on the common lead 304. A low-noise amplifier 303 is provided for each of the read heads 308, 310, 311 to amplify the readback signal from each of the read heads 308, 310, 311. As will be shown with respect to FIG. 9, in some embodiments the low-noise amplifiers can be configured to either pseudo-differential mode or single-ended mode. However, a pseudo-differential low-noise amplifier 303 is depicted in FIG. 3. A MR current bias circuit 302 is also provided for each of the read heads 308, 310, 311.

The common lead 304 is connected to the MRP terminal of each of the read heads 308, 310, 311, and to the P input terminal of each of three differential low-noise amplifiers (e.g., 303). The common lead 304 is driven by the common lead stabilizer circuit 301, a voltage regulator offering a high-impedance output at high frequencies at its collector.

The common lead stabilizer circuit 301 (or COMM stabilizer) includes a mean common-mode voltage circuit 312 operable to calculate the mean head common-mode voltage according to the following equation:

$$V_{COMM} = \frac{1}{3} \sum_{n=0,1,2} \frac{V_{MRP_n} + V_{MRN_n}}{2} \quad \text{(Eq 1)}$$

where $V_{MRP_n}$ is the voltage at the common terminal MRP of the read heads 308, 310, 311, provided at input 313 to the mean common-mode voltage circuit 312, and where $V_{MRN_n}$ are the voltages at each of the MRN terminals of the read heads 308, 310, 311, provided at inputs 314 through 315 to the mean common-mode voltage circuit 312. The mean head common-mode voltage $V_{COMM}$ is thus one sixth the sum of the voltages on all RMR terminals of the read heads 308, 310, 311.

A local loop containing an operational transconductance amplifier (OTA) 316 and a compensating integration capacitor 321 operates to regulate the common lead 304 to the potential which drives the mean head which drives the mean head common-mode voltage $V_{COMM}$ to zero. The closed-loop bandwidth of the VCOMM loop is set to a value below the lowest frequency at which pseudo-differential sensing is desired. Thus, if sensing is desired for frequencies >10 MHz, the closed-loop bandwidth may be chosen as 1 MHz. The loop gain $LG_{COMM}$ of the COMM loop is:

$$LG_{COMM}(j\omega) \cong -\frac{g_{m\_316}}{j\omega C_{321}} \cdot \frac{Z_{COMM}(j\omega)}{R_{324}} \quad \text{(Eq 2)}$$

where $Z_{COMM}$ is the effective impedance seen on the COMM line by the collector of transistor 325. In some cases, a zero may be included in LG. Relative to a disturbance current $I_D$ injected on VCOMM, the closed-loop perturbation of VCOMM is therefore, $$V_{COMM} = \frac{I_D Z_{COMM}}{1 + LG_{COMM}} \quad \text{(Eq 3)}$$

Maintenance of a high $V_{COMM}$ impedance over the frequency range of interest allows the COMM line to participate in pseudo-differential sensing of MR head voltage.

In some embodiments of the COMM stabilizer, a current source 323 and PFET transistor 323 connected between a power rail and a bias potential control a driver transistor 325 based on the output 320 of the OTA 316, with a degeneration resistor 324 connected between the power rail and the common lead 304. In other embodiments, the common lead 304 is regulated to zero volts (GND) by replacing the mean common-mode voltage circuit 312 with a direct connection to the common lead 304.

The MR current bias circuit 302 operates as a programmable-value current-sink circuit, one per read head 308, 310, 311. The MR current bias circuit 302 includes a main output transistor 341 having an area A times that of a matched mirror transistor 337. Correspondingly the degeneration resistor 340 has a value that is A times that of the resistor 342 connected to the output transistor 341. A bias resistor 333 is connected between the mirror transistor 337 and ground, and an adjustable bias current source 472 is connected in series with the mirror transistor 337 between a power rail and a bias potential. An OTA 330 closes the loop around the mirror transistor 337, enforcing a current $I_{BIAS}/A$ in the mirror transistor 337, hence a current $I_{BIAS}$ in the output transistor 341 and in the associated MR read head (e.g., 308). The response of the bias current loop can be controlled by a capacitor 334, transistor 335 and current source 336 between the OTA 330 and the mirror transistor 337 and is expressed as, $$LG_{ISINK}(j\omega) \cong -\frac{g_{m\_330}}{j\omega C_{334}} \cdot \frac{R_{333}}{R_{340}} \quad \text{(Eq 4)}$$

yielding the transfer function relating perturbation of current $I_{305}$ sunk from line 305 to changes in demand current $I_{331}$ of, $$I_{305} = \frac{A \cdot LG_{ISINK}}{1 + LG_{ISINK}} \times I_{331} \quad \text{(Eq 5)}$$

Owing to the collector output of device 341, the current sink loop's output impedance is very high, as desired.

Figure 6:
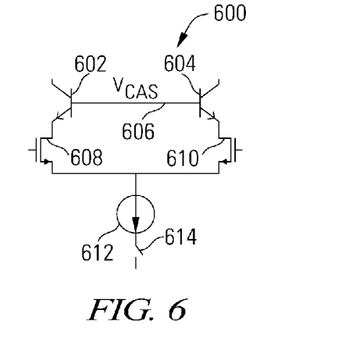
FIG. 6 depicts an amplifier circuit suitable for use as a gain stage core in some embodiments of a low-noise amplifier of a preamplifier.
Figure 7:
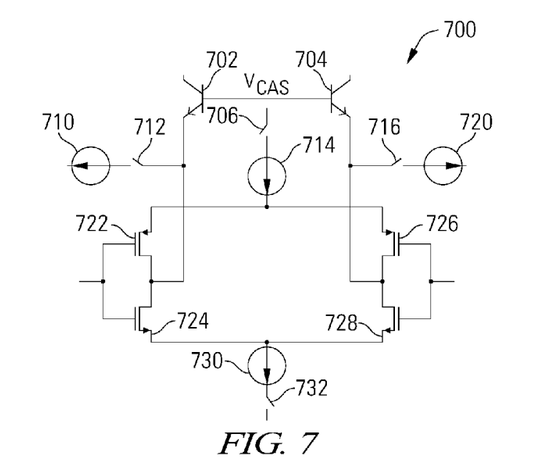
FIG. 7 depicts another amplifier circuit suitable for use as a gain stage core for use in some embodiments of a low-noise amplifier of a preamplifier.

The pseudo-differential low-noise amplifiers (e.g., 303) can use any suitable type of amplifier, such as, but not limited to, the shunt feedback differential amplifier shown in FIG. 3. The input differential pair of input transistors 359, 358 is shown in NMOS technology, but could equally be bipolar or other topologies such as stacked NMOS-PMOS current-reuse pairs as shown in FIGS. 6-7. The gates of a differential pair of input transistors 359, 358 are connected to one of the MR read heads (e.g., 308) and to the common lead 304, respectively, through AC coupling capacitors 363, 367. The common sources of the differential pair of input transistors 359, 358 are connected to a tail current source 360. The drains of the differential pair of input transistors 359, 358 are connected to load resistors 354, 355 through bipolar junction cascode transistors 356, 357 having common bases biased at cascode voltage $V_{CAS}$.

The differential output nodes between the cascode transistors 356, 357 and the load resistors 354, 355 are connected to the bases of shunt feedback transistors 361, 365. The emitter-follower transistors 361, 365 are connected in series with variable feedback resistors 362, 366 between the power rail and the input nodes. The input impedance of the LNA (e.g., 303) is programmed by varying the feedback resistors 362, 366. In shunt-feedback configurations, the differential input impedance is given approximately by:

$$Z_{IN} = 2 \cdot \frac{R_{FB}}{1 + g_m R_L} \quad \text{(Eq 6)}$$

where $g_m$ is the transconductance of one side of the input differential pair, where $R_{FB}$ is the resistance of the corresponding feedback resistor 362 or 366, and where $R_L$ is the resistance of the corresponding load resistor 354 or 355.

Within the low-noise amplifiers (e.g., 303), it is important to assure that no DC current flows in the feedback resistors 362, 366 as current flow would degrade MR bias accuracy. Nulling loops comprising two OTAs 345, 346 and associated compensating capacitors 352, 353 individually sense the DC voltage across their corresponding feedback resistors. Gate leak resistors 370, 371 are provided in some embodiments between the gates of transistors 358, 359 and a bias potential. OTA 345 senses the DC voltage across feedback resistor 366, and OTA 346 senses the DC voltage across feedback resistor 362. The OTAs 345, 346 in the nulling loops force the voltages across the feedback resistors 362, 366 to zero using voltage-controlled current sources comprising transistors 347, 348, resistors 350, 351, and current sources 368, 364. In some embodiments, the corrective currents from the nulling feedback loop are injected into the emitters of cascode transistors 356, 357 as shown in FIG. 3, reducing parasitic effects. However, other injection points can be used in other embodiments.

The LNA output is taken at the differential output nodes between the cascode transistors 356, 357 and the load resistors 354, 355, and directly reflects the voltage $V_{MR}$, the voltage across the corresponding MR read head (e.g., 308).

Each OTA 316, 330, 345, 346 is provided with gain-control inputs and an 'LG/HG/Hold' digital control line. Gain controls adjust OTA transconductance to account for variation in attached MR head resistance $R_{MR}$ and feedback resistance $R_{FB}$. The OTAs 316, 330, 345, 346 are operable in High and Low gain modes, corresponding to Fast-acquisition-from-Write and Read phases. The OTAs 316, 330, 345, 346 are disabled between Reads, allowing the feedback loop state to be preserved on the associated compensating capacitors (e.g., 321).

Figure 4:
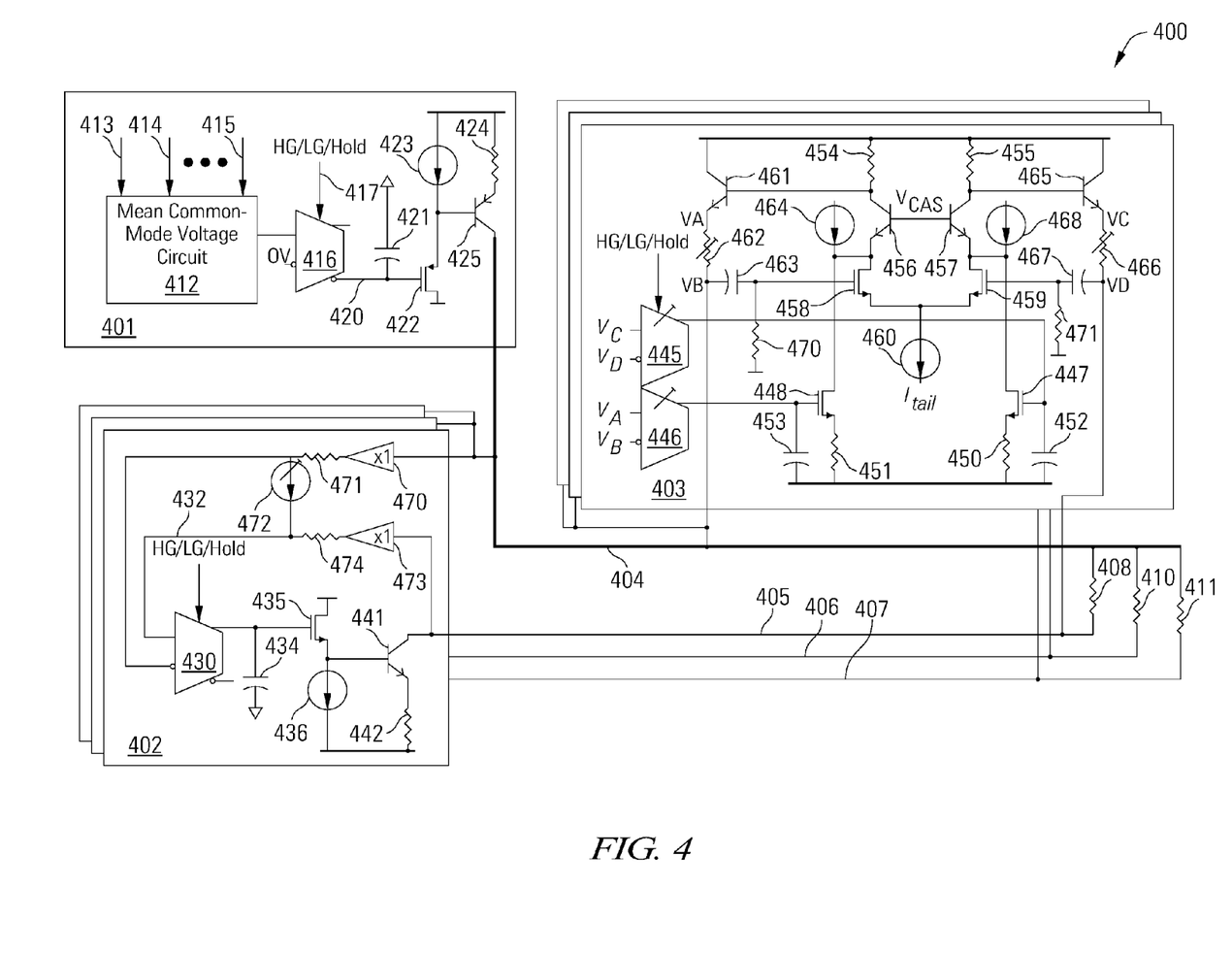
FIG. 4 depicts a voltage-mode head bias circuit for a pseudo-differential shared-pin array of read heads in accordance with some embodiments of the present invention.
Figure 9:
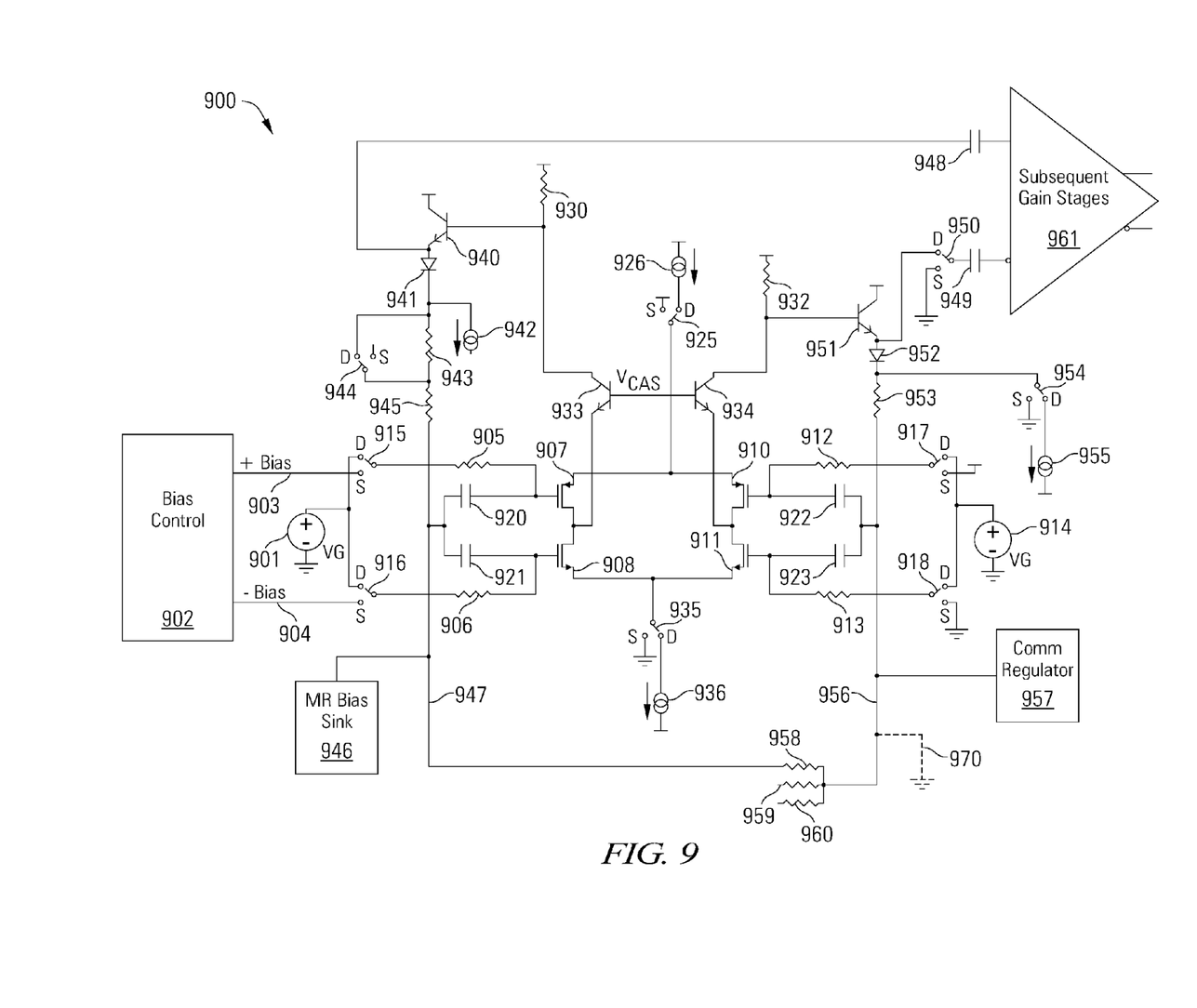
FIG. 9 depicts a reconfigurable low noise amplifier that can be configured between pseudo-differential and single-ended operation in accordance with some embodiments of the present invention.

Turning to FIG. 4, a voltage-mode head bias circuit 400 for a pseudo-differential shared-pin array of read heads is depicted in accordance with some embodiments of the present invention. The common lead stabilizer circuit 401 and LNA's (e.g., 403) operate as in the current head bias circuit 300 of FIG. 3, and a voltage bias circuit (e.g., 402) for each of the MR read heads 408, 410, 411 drives the voltage across each of the MR read heads 408, 410, 411 to the desired voltage bias value.

The common lead stabilizer circuit 401 is connected to the common lead 404 to the MR read heads 408, 410, 411, stabilizing the DC voltage on the common lead 404 as previously described in connection with FIG. 3. A low-noise amplifier 403 is provided for each of the read heads 408, 410, 411 to amplify the readback signal from each of the read heads 408, 410, 411. As will be shown with respect to FIG. 9, in some embodiments the low-noise amplifiers can be configured to either pseudo-differential mode or single-ended mode. However, a pseudo-differential low-noise amplifier 403 is depicted in FIG. 4.

The common lead 404 is connected to the MRP terminal of each of the read heads 408, 410, 411, and to the P input terminal of each of three differential low-noise amplifiers (e.g., 403). The common lead 404 is driven by the common lead stabilizer circuit 401, a voltage regulator offering a high-impedance output at high frequencies at its collector.

The common lead stabilizer circuit 401 includes a mean common-mode voltage circuit 412 operable to calculate the mean head common-mode voltage according to the Equation 1. A local loop containing an OTA 416 and a compensating integration capacitor 421 operates to regulate the common lead 404 to the potential which drives the mean head, driving the mean head common-mode voltage $V_{COMM}$ to zero.

In some embodiments, a current source 423 and PFET transistor 423 connected between a power rail and a bias potential control a driver transistor 425 based on the output 420 of the OTA 416, with a degeneration resistor 424 connected between the power rail and the common lead 404. In other embodiments, the common lead 404 is regulated to zero volts (GND) by replacing the mean common-mode voltage circuit 412 with a direct connection to the common lead 404.

The pseudo-differential low-noise amplifiers (e.g., 403) can use any suitable type of amplifier circuit, such as, but not limited to, the shunt feedback differential amplifier shown in FIG. 4. The input differential pair of input transistors 459, 458 is shown in NMOS technology, but could equally be bipolar or other topologies such as stacked NMOS-PMOS current-reuse pairs. The gates of a differential pair of input transistors 459, 458 are connected to one of the MR read heads (e.g., 408) and to the common lead 404, respectively, through AC coupling capacitors 463, 467. The common sources of the differential pair of input transistors 459, 458 are connected to a tail current source 460. The drains of the differential pair of input transistors 459, 458 are connected to load resistors 454, 455 through bipolar junction cascode transistors 456, 457 having common bases biased at cascode voltage $V_{CAS}$.

The differential output nodes between the cascode transistors 456, 457 and the load resistors 454, 455 are connected to the bases of emitter-follower transistors 461, 465. The shunt feedback transistors 461, 465 are connected in series with variable feedback resistors 462, 466 between the power rail and the input nodes. The input impedance of the LNA (e.g., 403) is programmed by varying the feedback resistors 462, 466.

Within the low-noise amplifiers (e.g., 403), it is important to assure that no DC current flows in the feedback resistors 462, 466 as current flow would degrade MR bias accuracy. Nulling loops comprising two OTAs 445, 446 and associated compensating capacitors 452, 453 individually sense the DC voltage across their corresponding feedback resistors. Gate leak resistors 470, 471 are provided in some embodiments between the gates of transistors 458, 459 and a bias potential. OTA 445 senses the DC voltage across feedback resistor 466, and OTA 446 senses the DC voltage across feedback resistor 462. The OTAs 445, 446 in the nulling loops force the voltages across the feedback resistors 462, 466 to zero using voltage-controlled current sources comprising transistors 447, 448, resistors 450, 451, and current sources 468, 464. In some embodiments, the corrective currents from the nulling feedback loop are injected into the emitters of cascode transistors 456, 457 as shown in FIG. 4, reducing parasitic effects. However, other injection points can be used in other embodiments.

The LNA output is taken at the differential output nodes between the cascode transistors 456, 457 and the load resistors 454, 455, and directly reflects the voltage $V_{MR}$, the voltage across the corresponding MR read head (e.g., 408).

Each OTA 416, 430, 445, 446 is provided with gain-control inputs and an 'LG/HG/Hold' digital control line. Gain controls adjust OTA transconductance to account for variation in attached MR head resistance $R_{MR}$ and feedback resistance $R_{FB}$. The OTAs 416, 430, 445, 446 are operable in High and Low gain modes, corresponding to Acquisition and Read phases. The OTAs 416, 430, 445, 446 are disabled between Reads, allowing the feedback loop state to be preserved on the associated compensating capacitors (e.g., 421).

In voltage-bias mode, the MR voltage bias circuit 402 senses the potential difference between the common read head terminal MRP for the common lead 304 and the read head terminal MRN for the connected MR read head (e.g., 408). The MR voltage bias circuit 402 drives this voltage to the desired voltage bias value. The bias voltage regulation can be performed in any suitable manner with any suitable voltage regulation circuit. In some embodiments, the voltage of each input is buffered in buffer circuits 470, 473. A current source 472 of intensity $I_{VBIAS}=V_{BIAS}/R_{BIAS}$ forces current through a total resistance $R_{BIAS}$ made up of resistors 471, 474, each having a value of $R_{BIAS}/2$. A loop containing an OTA 430 and a compensating capacitor drives the voltage difference $(V_{MRP}-V_{MRN})-V_{BIAS} \rightarrow 0$. An output driver transistor 441 and degeneration resistor 442 drive the bias voltage on the MR read head (e.g., 408). The response of the bias loop can be controlled by a capacitor 434, transistor 435 and current source 436 between the OTA 430 and output driver transistor 441.

Figure 5:
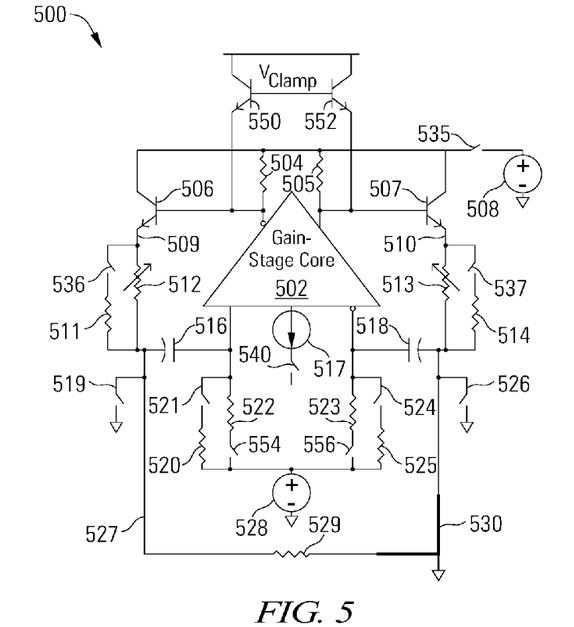
FIG. 5 depicts a low-noise amplifier with rapid start-up from a low power state for use in some embodiments of a head bias circuit.

Turning to FIG. 5, the enhancements required of the circuits of FIGS. 3 and 4 to permit their fast start-up from a low-power state are described in connection with a low-noise amplifier 500 with rapid start-up from a low power state. By reducing the start-up time from a low power state, the amount of disc space lost during the transition is reduced and mean areal density is increased.

The MR sensor 529 is shown in schematic form as a resistor, connected between the differential inputs 527, 530 of the LNA 500, with one of the differential inputs 530 being connected to the common lead. The differential inputs 527, 530 are connected to the inputs of a gain stage core 502 through AC coupling or DC blocking capacitors 516, 518. The gain stage core 502 drives load resistors 504, 505 with a tail current from current source 517. High value gate leak resistors 522, 523 are connected at the input stage of the gain stage core 502 to drain off residual leakage current from the input stage gate nodes. The leak resistors 522, 523 are shown connected to a voltage source 528, which could be 0V (GND) if, for example, metal-insulator DC blocking capacitors 516, 518 are used, or which could be at a non-zero voltage to polarize metal oxide semiconductor capacitors (MOSCAP) DC blocking capacitors 516, 518 if such capacitors are used to reduce area.

The differential outputs of the gain-stage core 502 are connected to the bases of shunt feedback transistors 506, 507. The output nodes 509, 510 at the emitters of the shunt feedback transistors 506, 507 are connected to variable feedback resistors 512, 513, which are connected between the output nodes 509, 510 and the input nodes 527, 530. Catch transistors 550, 552 prevent saturation in the Gain Stage Core when switch 535 is opened.

During the read-to-write transition and into the subsequent write mode, when a read gate signal is de-asserted at the end of a read operation, the LNA 500 is powered down, switches 540 and 535 are opened, clamp heads switches 519, 526 are closed, grounding the input nodes 527, 530 and protecting the attached MR read head 529 and LNA input stage from electrostatic discharge. At the same time, OTA's such as those shown in FIGS. 3, 4 are disabled by setting the 'LG/HG/Hold' digital control lines to Hold, preserving on their loop-compensating capacitors the states existing at the end of the prior read operation. At this same time, switches 521, 524, 554, 556 all open, thus floating the LNA-side of input AC coupling capacitors 516 and 518, and maintaining their charge at the value it had during the preceding Read operation.

Transition into Read mode proceeds in two steps. In the first, anticipatory to assertion of Read Gate, for a typically 500 ns interval, the Gain Stage Core 502 bias state is established. In the second, Fast Recovery, trim of input AC coupling capacitor and bias/nulling loop stages is accomplished. Following trim, normal read mode is established and data transfer from the disc proceeds. Upon the rise of a read gate assertion, the LNA 500 is powered up by closing the switch 540 to apply the current source 517 to the gain stage core 502, while the input clamps 519, 526 remain active to screen the MR read head 529 from any power-up transients. Catch transistors 550, 552 prevent the gain stage core's bipolar cascode device from saturating. Upon completion of power up, the input clamps 519, 526 are opened. The fast recovery switches 536, 537, 521, 524 are closed, maintaining the zero differential voltage across the gain stage inputs of the LNA 500. This zero potential condition is the condition prevailing during much of the read operation.

During fast recovery, the DC blocking capacitors 516, 518 are charged from their held states through the combined low resistance of the fast recovery switches 536, 537 and the feedback resistor shunt resistors 511, 514, to a total voltage of $V_{MR}$, the voltage existing across the MR read head 529. The low clamping impedance greatly reduces loop gain, preventing stability problems. Once the DC blocking capacitors 516, 518 have charged, the loop OTA's are activated in high gain state by setting the 'LG/HG/Hold' digital control lines to HG so as to rapidly converge to the steady-state values.

Because the inputs 527, 530 of the LNA 500 are clamped to zero during power up and fast recovery, power up is achieved symmetrically and the gain stage 502 remains effectively in the equilibrium state existing during read operations. As a result, during the fast recovery phase, the LNA 500 is effectively disconnected from the nulling and MR bias feedback loops, which seek their steady state.

Making the time constant established by the leak resistors 522, 523 and DC blocking capacitors 516, 518 much longer than the time constant associated with the low corner frequency of the LNA 500 allows the nulling loop and/or subsequent AC coupling stages to programmable set the low corner frequency. Upon completion of the fast recovery/high gain phases, the OTAs are transitioned to their low gain tracking condition by setting the 'LG/HG/Hold' digital control lines to LG to achieve the desired low corner frequency.

The gain-stage core 502 can use any suitable amplifier circuit, such as, but not limited to, the circuit 600 of FIG. 6, the circuit 700 of FIG. 7, or any other type of amplifier circuits. Turning to FIG. 6, one type of amplifier circuit 600 as applied in the low noise amplifiers of FIGS. 3 and 4 includes differential input transistors 608, 610 connected between tail current source 612 and cascode transistors 602, 604, which are controlled by cascode voltage 606. The amplifier circuit 600 can be disabled by switch 614 to disconnect the tail current. Turning to FIG. 7, another type of amplifier circuit 700 has a current-reuse topology, with complementary differential input transistor pairs 722, 724 and 726, 728 connected between current sources 714, 730. Cascode transistors 702, 704 are connected to the output nodes. Nulling injector current sources 710, 720 are connected to the output nodes through switches 712, 716, to switchably apply nulling currents from the nulling loops in various stages of operation. The amplifier circuit 700 can be disabled by switch 732 to disconnect the tail current.

Figure 8:
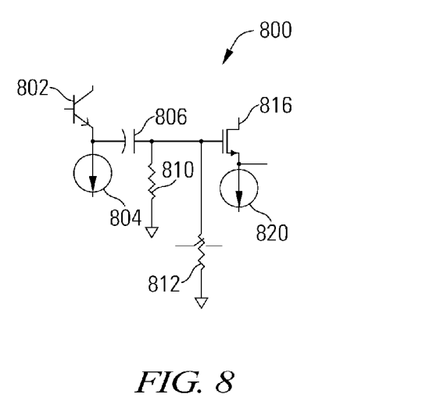
FIG. 8 depicts a soft transition AC coupling input circuit with a variable time constant in accordance with some embodiments of the present invention.

Turning now to FIG. 8, a soft transition AC coupling input circuit 800 with a variable time constant is depicted in accordance with some embodiments of the present invention, which can be used for example at the input stage of the preamplifier 226. An emitter-follower input stage comprising transistor 802 and current source 804 and an output stage comprising transistor 816 and current source 820 surround a variable time constant comprising AC coupling capacitor 806, resistor 810 and switched resistor 812. Such a soft transition AC coupling input circuit can be used to prevent peak capture in the transition to the low corner frequency and to provide fast recovery. The switched resistor 812 is switched out to provide a soft transition. AC coupling also removes the DC offset present at the input stage output, preventing it from saturating subsequent stages or requiring factory trimming to eliminate.

Turning now to FIG. 9, a reconfigurable low noise amplifier 900 is depicted that can be configured between pseudo-differential and single-ended operation in accordance with some embodiments of the present invention.

In this embodiment, a gain stage core comprises a current-reuse totem-pole amplifier. However, as indicated above, any amplifier topology can be used. The differential gain stage core comprises a set of complementary differential input transistor pairs 907, 908 and 910, 911, with common drains of the complementary pairs connected to load resistors 930, 932 through cascode transistors 933, 934. The common N-channel sources of the complementary pairs are connected to a tail current supply 936 when a switch 935 places the LNA 900 in pseudo-differential mode, and to a ground when the switch 935 places the LNA 900 in single-ended mode. The common P-channel sources of the complementary pairs are connected to a current source 926 when a switch 925 places the LNA 900 in pseudo-differential mode, and to a bias reference when the switch 925 places the LNA 900 in single-ended mode.

Switches 944, 916, 950, 917, 918, 925, 935, 954 govern configuration of the system between differential (labeled 'D') and single-ended (labeled 'S) modes. In Differential mode, operation of circuit 900 is as explained in conjunction with FIGS. 3 and 4. Nulling loops are associated with feedback resistors 943/945 and 953, as previously described in connection with FIGS. 3 and 4. For clarity, these loops are omitted from FIG. 9. Similarly, blocks 946 and 957 of FIG. 9 have counterparts in blocks 302 and 301, respectively, of FIG. 3.

In overview, during Single Ended mode, the right hand side (e.g., 911, 910, 935, 951, 953 etc.) of the LNA is disabled; only the left hand side remains operative. Switch 935 replaces the virtual ground characteristic of differential mode, with a true ground.

In Differential and Single-Ended modes, the LNA gain and input impedance are given (for large loop gain) approximately by, $$A_{V\_SE} \cong \frac{R_{FB\_SE}}{R_{MR}} \quad \text{(Eq 7)}$$

$$Z_{IN\_SE} \cong \frac{R_{FB\_SE}}{1 + g_m R_L} \quad \text{(Eq 8)}$$

$$A_{V\_DM} \cong \frac{R_{FB\_DM}}{R_{MR}/2} \quad \text{(Eq 9)}$$

$$Z_{IN\_DM} \cong 2 \cdot \frac{R_{FB\_DM}}{1 + g_m R_L} \quad \text{(Eq 10)}$$

whence it is seen that an approximate doubling of RFB (945) in Single-Ended mode is used to achieve the same gain and input impedances as in Differential mode.

Emitter-follower transistors 940, 951 are connected to the load resistors 930, 932. Feedback resistors 943, 945, 953 are connected to the emitter-follower transistors 940, 951 through diodes 941, 952. The feedback resistors 945, 953 are also connected to input nodes 947, 956, which drive the gates of the complementary differential input transistor pairs 907, 908 and 910, 911 through AC coupling or DC block capacitors 920, 921, 922, 923. When switch 944 places the LNA 900 in pseudo-differential mode, feedback resistor 943 is shorted out or bypassed. The resultant reduction in net value of RFB by an approximate factor of two is, as described above, used to make Single Ended and Differential mode gains equal. A tail current source 942 provides a tail current to the left hand side emitter-follower transistor 940.

The input nodes 947, 956 are connected across an MR read head (e.g., 958), with one input node 956 connected to the common lead. Other LNA amplifiers are provided for each of the other MR read heads (e.g., 959, 960).

Subsequent gain stages 961 correspond to block 230 of FIG. 2 and are connected to output nodes at the emitters of the emitter-follower transistors 940, 951 through AC coupling capacitors 948, 949 which block the DC offset. When the LNA 900 is placed in single-ended mode by switch 950, the inverting input to subsequent gain stages 961 is grounded, thus allowing single-ended to differential conversion to be performed at the input of stages 961.

An MR current bias circuit 946 operates as a current-sink for the MR read head (e.g., 958) in both modes, and a common lead stabilizer circuit 957 provides a voltage bias for the common lead in differential mode only. When in single-ended mode, the input node 956 at the common lead is grounded by the user. A node between feedback resistor 953 and diode 952 is grounded when switch 954 places the LNA 900 in single-ended mode and that half of the differential amplifier is disabled, and is connected to tail current source 955 when switch 954 places the LNA 900 in pseudo-differential mode.

A gate voltage source 901 applies a voltage to the gates of a complementary differential input pair of transistors 907, 908 through gate leak resistors 905, 906 when the LNA 900 is configured in pseudo-differential mode by switches 915, 916. When the LNA 900 is configured in single-ended mode by switches 915, 916, a bias potential generated by a bias control circuit 902 is applied to the gates of the complementary differential input pair of transistors 907, 908 through gate leak resistors 905, 906.

Similarly, a gate voltage source 914 applies a voltage to the gates of the other complementary differential input pair of transistors 910, 911 through gate leak resistors 912, 913 when the LNA 900 is configured in pseudo-differential mode by switches 917, 918. When the LNA 900 is configured in single-ended mode by switches 917, 918, the gates of the complementary differential input pair of transistors 910, 911 are connected to a well-bypassed DC supply rail and system ground, respectively, through gate leak resistors 912, 913, thus shutting them off.

In some embodiments, the LNA 900 is provided with register-selectable reconfiguration, allowing a single chip to serve multiple applications. Thus, when the CMOS switches are in the 'D' positions, the LNA 900 functions as previously described in association with FIGS. 2 and 3. When the CMOS switches are in the 'S' positions, the LNA 900 operates in single-ended mode, with the left hand side of the input stage serving alone as the single-ended input. The right hand side of the input differential pair is disabled, and the input stage tail currents are removed, as is the tail current 955 of the right hand side emitter-follower. Thus, provision of register selectable configuration allows the user to trade off superior interference rejection of the pseudo-differential scheme, with decreased power consumption of the single-ended scheme.

In single-ended mode, as depicted in FIG. 9, the common lead stabilizer circuit 957 is disabled/floated to conserve power. The common terminal is then unused, and it is the user's responsibility to connect the MR head common wire to a secure ground point 970. The active head terminal is connected to the MRN pin. Also tied to the MRN pin is the MR current bias circuit 946, which operates identically in both single-ended and pseudo-differential operation, in either current-bias or voltage-bias modes.

Also, in single-ended mode, the nulling OTA associated with the (now unused) right hand side is unnecessary and is disabled to save power.

To maintain similar input impedance between pseudo-differential and single-ended mode, the resistance of the left hand side feedback resistor 943, 945 is increased by ~2× by switch 944 which includes feedback resistor 943 in the current path. Increasing the feedback resistor value also restores LNA gain to the same value as that exhibited in pseudo-differential operation. The right hand side feedback resistance 953 is not switched, as the right hand side is used only in pseudo-differential operation.

In pseudo-differential mode, the input differential pair of the LNA 900 of FIG. 9 is conventionally biased as described earlier with tail current sources; and gate leak resistors connected to the same fixed voltage Vg. In single-ended mode, such an approach is not used, and instead, the input MOS devices are viewed as part of a current mirror such that DC current in a reference device sets input stage current. Nanometer-scale input devices are used because of their high-frequency capability, and these exhibit significant channel-length modulation effects modeled by λ factor. For accurate mirroring, equal Vds should be maintained on both reference and slave (LNA input) devices.

Figure 10:
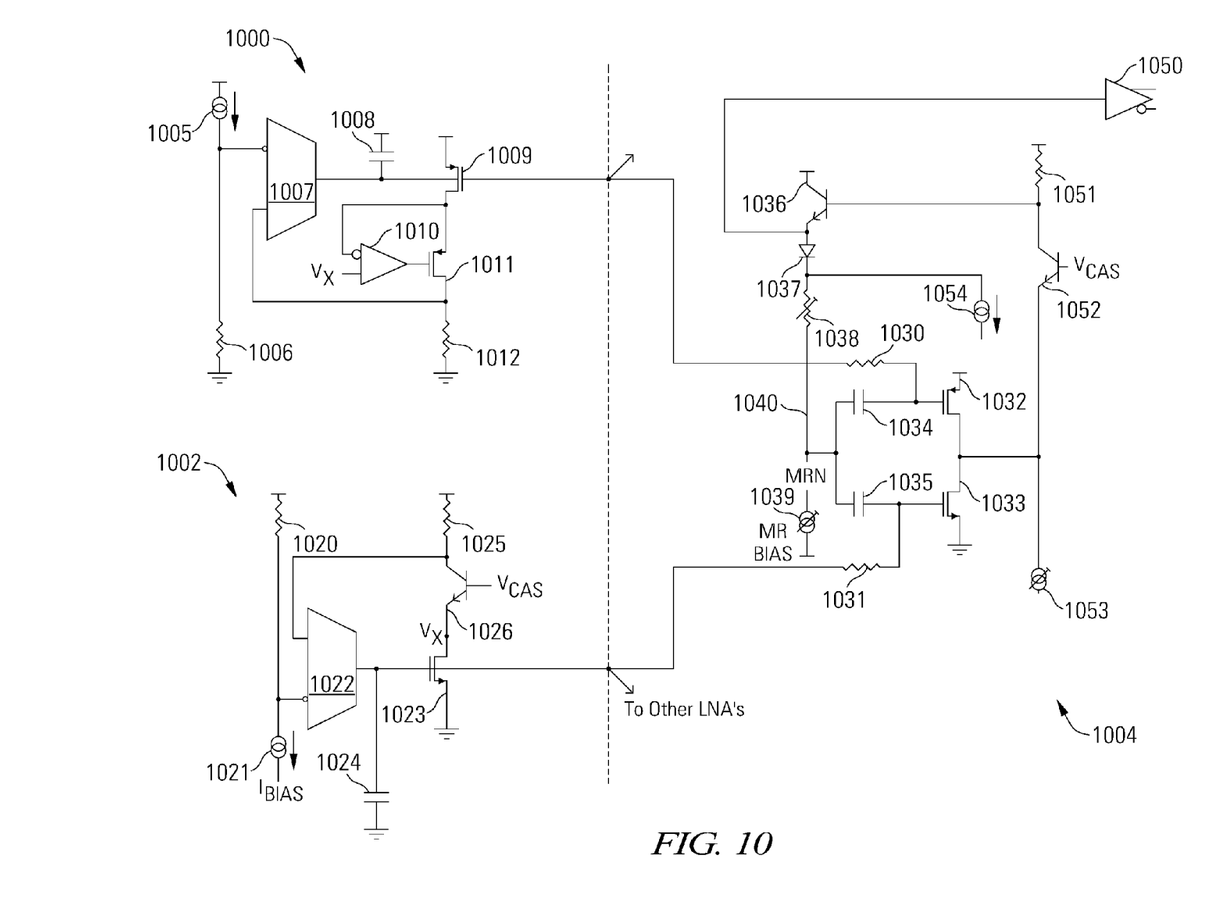
FIG. 10 depicts an input stage quiescent-current-setting circuit and a shunt-feedback stage of a low noise amplifier in accordance with some embodiments of the present invention.

Accordingly, the method of FIG. 10 is adopted, which impresses the same Vds on the reference device as present on the LNA input device, thus accounting equally in both reference and mirror devices for channel-length modulation effect. Turning now to FIG. 10, input-stage biasing circuits 1000, 1002 and a shunt-feedback stage 1004 of a low noise amplifier are depicted in accordance with some embodiments of the present invention. FIG. 10 is drawn as the active left-hand side of FIG. 9, with the additional input stage bias circuitry shown to the left of the dotted vertical line.

A lower input-stage biasing circuit 1002 sets the NMOS input stage standing current $I_Q$ using an OTA 1022 and compensating integration capacitor 1024, comparing a feedback voltage generated by NMOS replica transistor 1023, cascode transistor 1026 and current-sensing load resistor 1025, with a reference voltage generated by bias current source 1021 and resistor 1020. NMOS replica device 1023 is a (1/n)*W/L scaled version of main LNA input transistor 1033 which has dimensions W/L. Down-scaling reduces current drain in bias circuit 1002. A voltage $V_X$ taken between feedback transistor 1023 and cascode transistor 1026 is used in the upper input-stage biasing circuit 1000 in setting the PMOS input stage standing current $I_Q$. An OTA 1007 and compensating integration capacitor 1008 set the PMOS input stage standing current $I_Q$, comparing a feedback voltage generated by PMOS transistor 1009, NMOS transistor 1011 and resistor 1012, with a reference voltage generated by bias current source 1005 and resistor 1006 and driving them to equality. Amplifier 1010 forces the voltage at the node between PMOS transistor 1009, NMOS transistor 1011 to $V_X$. In this way, Vds of the reference transistors 1023 and the main transistor 1033 are made equal, hence in the case of the NMOS devices, $$I_{D\_1033} = I_{D\_1023} \times \frac{(W/L)_{1033}}{(W/L)_{1023}} \times \frac{1 + \lambda V_{DS\_1033}}{1 + \lambda V_{DS\_1023}} \quad \text{(Eq 11)}$$

So that $$\frac{1 + \lambda V_{DS\_1033}}{1 + \lambda V_{DS\_1023}} = 1.$$

An identical situation prevails for PMOS devices 1032 and 1011.

The input shunt-feedback stage 1004 includes a complementary pair of input transistors 1032, 1033, driven by an input node 1040 through AC coupling capacitors 1034, 1035.

The input stage standing current signals are connected to the gates of the complementary pair of input transistors 1032, 1033 through gate leak resistors 1030, 1031. Emitter-follower transistor 1036 is connected to input node 1040 through diode 1037 and feedback resistor 1038. A tail current source 1054 provides a tail current to emitter-follower transistor 1036. The input node 1040 is connected to the MRN terminal of the MR read sensor, with a bias current source 1039 providing a bias current to the MR read sensor. The output of the complementary pair of input transistors 1032, 1033 drives the emitter-follower transistor 1036 through cascode transistor 1052, with load resistor 1051 connected to the cascode transistor 1052. Injection current source 1053 is controlled by the nulling loop described previously and drives the potential across feedback resistor 1038 to zero. A single-ended to differential converter 1050 can be used to convert the single-ended output to a differential signal and to provide AC coupling.

Figure 11:
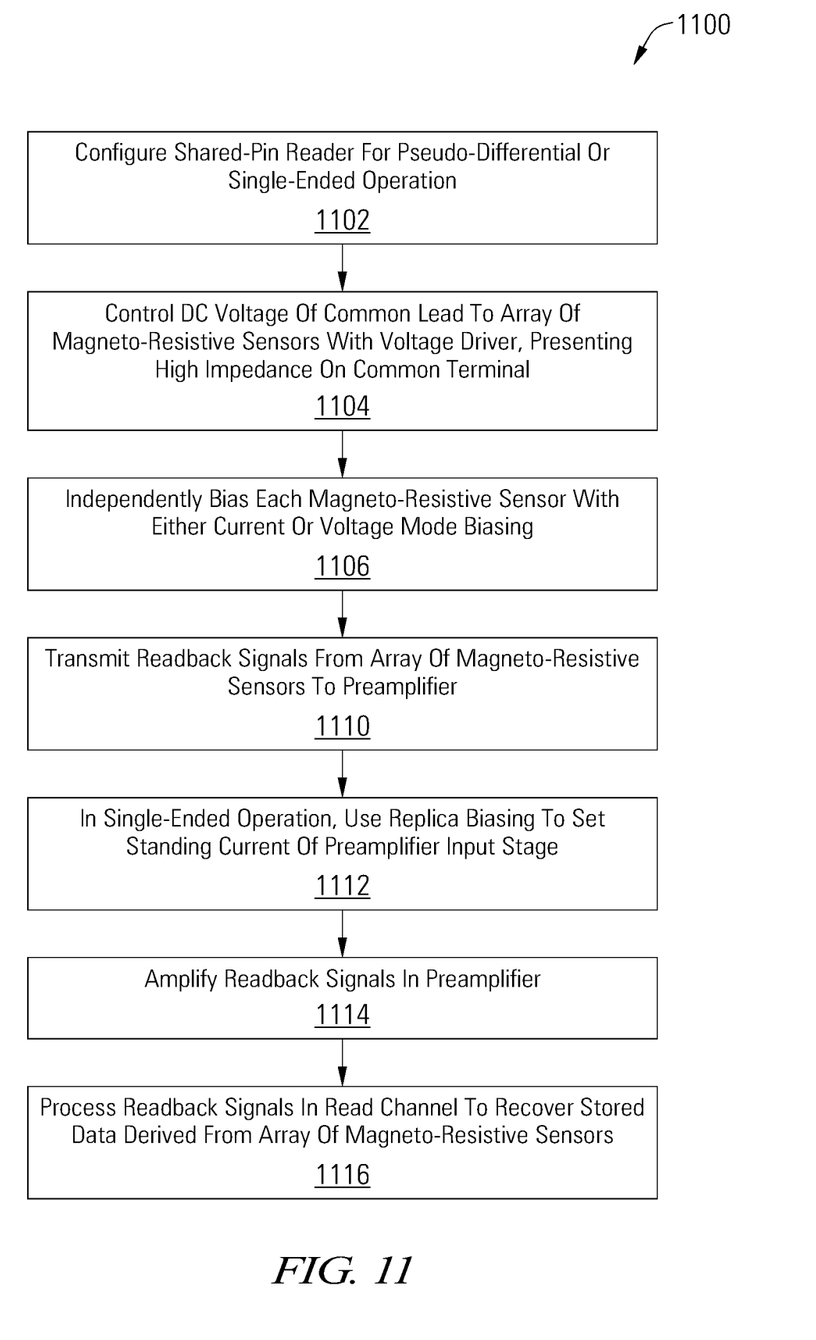
FIG. 11 is a flow diagram of an operation to process readback signals in a two-dimensional magnetic recording system in accordance with some embodiments of the present invention.

Turning to FIG. 11, a flow diagram 1100 is depicted of an operation to process readback signals in a two-dimensional magnetic recording system in accordance with some embodiments of the present invention. Following flow diagram 1100, the shared-pin reader is configured for either pseudo-differential or single-ended operation. (Block 1102) In some embodiments, the shared-pin reader is hardwired to support only pseudo-differential or single-ended operation. The DC voltage of the common lead to an array of MR sensors or read heads is controlled with a voltage driver, presenting a high impedance on the common lead. (Block 1104) The impedance presented at the common lead by the voltage driver can be adapted to any desired level, for example to avoid impairing differential sensing between a lead to one of the read heads and the common lead. Each MR sensor is independently biased using either current or voltage mode biasing. (Block 1106) The readback signals from the MR sensors are transmitted to a preamplifier. (Block 1110) In some embodiments, the preamplifier comprises one or more low-noise amplifiers. The head biasing can be performed by circuits in the preamplifier or in any other suitable location of the signal path. When configured for single-ended operation, the standing current of the preamplifier input stage is set using replica biasing. (Block 1112) The readback signals are amplified in the preamplifier. (Block 1114) The amplified readback signals are processed in a read channel to recover stored data retrieved by the array of MR sensors. (Block 1116)

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for a pseudo-differential shared-pin reader for two-dimensional magnetic recording. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus for two-dimensional magnetic recording, comprising:
    a storage medium;
    an array of magnetoresistive read heads disposed adjacent the storage medium and spaced to read a data track, wherein the array of magnetoresistive read heads share a common terminal;
    a plurality of leads connected to the array of magnetoresistive read heads, with one lead for each of the magnetoresistive read heads, plus a common lead connected to the common terminal, wherein each of the plurality of leads other than the at least one common lead are referenced to the at least one common lead;
    a preamplifier connected to the array of magnetoresistive read heads by the plurality of leads and operable to perform pseudo-differential sensing of signals from the array of magnetoresistive read heads, wherein the preamplifier is configured to apply replica biasing to set a standing current of an input stage; and
    a voltage driver connected to the common terminal, configured to control a DC voltage on the common lead.

2. The apparatus of claim 1, further comprising a plurality of read head bias circuits, each connected to one of the magnetoresistive read heads by a corresponding one of the plurality of leads.

3. The apparatus of claim 2, wherein the read head bias circuit is operable to bias each of the plurality of magnetoresistive read heads at independent bias levels.

4. The apparatus of claim 1, wherein the preamplifier is configurable between pseudo-differential and single-ended configurations.

5. The apparatus of claim 1, wherein the preamplifier comprises an input clamp operable to clamp an input to the preamplifier to ground when the array of magnetoresistive read heads are in a non-read mode.

6. The apparatus of claim 1, wherein the preamplifier comprises a direct-current blocking input capacitor.

7. The apparatus of claim 1, wherein the voltage driver is configured to drive a common-mode voltage of the at least one common lead toward zero volts.

8. The apparatus of claim 1, wherein the voltage driver comprises a high output impedance driver to support differential sensing.

9. The apparatus of claim apparatus of claim 1, wherein the preamplifier comprises an input stage biasing circuit comprising at least one input transistor and at least one replica transistor, wherein the at least one replica transistor is scaled down with respect to the at least one input transistor to reduce current drain.

10. The apparatus of claim 9, wherein the input stage biasing circuit is operable to set an input stage standing current based on a current through the at least one replica transistor and on a current-sensing load resistor.

11. A method for accessing a magnetic storage device, comprising:
    passing a plurality of read heads over a data track on a storage medium;
    biasing each of the plurality of read heads using a read head bias circuit connected to the plurality of read heads by a plurality of leads comprising at least one common lead;

setting a standing current in an input stage of a preamplifier using replica biasing;

amplifying an analog signal from each of the plurality of read heads in the preamplifier connected to the plurality of read heads by the plurality of leads; and regulating a common-mode voltage of the at least one common lead toward zero volts.

12. The method of claim 11, further comprising selectably configuring the preamplifier between a pseudo-differential operating mode and a single-ended operating mode.

13. The method of claim 11, further comprising clamping an input to the preamplifier to ground when the plurality of magnetoresistive read heads are in a non-read mode.

14. The method of claim 13, further comprising disabling an operational transconductance amplifier in the preamplifier while in the non-read mode to preserve a capacitor voltage in the preamplifier while in the non-read mode.

15. The method of claim 13, further comprising placing an operational transconductance amplifier in the preamplifier in a high gain state while in a fast recovery mode.

16. The method of claim 13, further comprising placing an operational transconductance amplifier in the preamplifier in a low gain state while in a tracking mode.

17. The method of claim 13, further comprising powering up the preamplifier when the plurality of magnetoresistive read heads are placed in a read mode, and un-clamping the input to the preamplifier from ground after the preamplifier is powered up.

18. A storage system comprising:

a storage medium;

a two-dimensional magnetic recording head assembly disposed in relation to the storage medium and comprising a plurality of read heads sharing a common lead;

means for controlling a DC voltage of the common lead;

means for biasing each of the plurality of read heads; and means for amplifying the signals from each of the plurality of read heads in a preamplifier, wherein the preamplifier is configured to apply replica biasing to an input stage.

19. The storage system of claim 18, further comprising means for selectably configuring the means for amplifying between pseudo-differential and single-ended modes.

20. The storage system of claim 18, further comprising means for configuring the means for amplifying between a powered down mode, a low gain state and a high gain state.

21. The storage system of claim 18, further comprising means for clamping the read heads to a ground when in a non-read mode.

22. The storage system of claim 18, wherein the means for amplifying comprises an operational transconductance amplifier, further comprising means for disabling the operational transconductance amplifier in a non-read mode to preserve a capacitor voltage in the means for amplifying while in the non-read mode.

* * * * *